(12) United States Patent
Dow

(10) Patent No.: US 9,235,873 B2
(45) Date of Patent: Jan. 12, 2016

(54) TILE-BASED CACHING FOR RENDERING COMPLEX ARTWORK

(71) Applicant: Adobe Systems Incorporated, San Jose, CA (US)

(72) Inventor: Gordon Dow, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 201 days.

(21) Appl. No.: 14/015,211

(22) Filed: Aug. 30, 2013

(65) Prior Publication Data

US 2015/0062182 A1    Mar. 5, 2015

(51) Int. Cl.
*G06T 3/40* (2006.01)
(52) U.S. Cl.
CPC ............. *G06T 3/40* (2013.01); *G06T 2210/36* (2013.01); *G09G 2340/045* (2013.01)
(58) Field of Classification Search
None
See application file for complete search history.

(56) References Cited

U.S. PATENT DOCUMENTS

| 7,570,271 B1 * | 8/2009 | Brandt | 345/582 |
| 8,018,452 B1 | 9/2011 | Dow | |
| 2011/0221748 A1 * | 9/2011 | Hodges et al. | 345/419 |

* cited by examiner

*Primary Examiner* — Carlos Perromat
(74) *Attorney, Agent, or Firm* — Finch & Maloney PLLC

(57) ABSTRACT

Techniques are disclosed for rendering complex artwork using tile-based caching. The artwork is divided into one or more sets of separately rendered tiles. Each tile is progressively rendered at a particular scale level and stored in a cache. When the clip region or scale level is changed by the user, tiles in the cache that provide a so-called best rendering of the artwork in the clip region at the requested scale or zoom level are selected. The selected tiles can be displayed in the clip region while the artwork is rendered at the requested scale level. The best rendering includes the tile or tiles that are more completely rendered than other tiles in the cache, or if multiple tiles are as completely rendered as others, the best rendering includes the tile or tiles that are rendered at a scale level closest to the requested scale level.

21 Claims, 8 Drawing Sheets

Tier -1

Tier 0

Tier 1

TILE-BASED CACHING FOR RENDERING COMPLEX ARTWORK

FIELD OF THE DISCLOSURE

This disclosure relates generally to digital media processing, and more particularly, to techniques for rendering complex artwork using tile-based caching.

BACKGROUND

Digital media includes various kinds of media that are stored, transmitted, accessed and manipulated electronically. Examples of digital media having visually perceptible content include digital images and artwork, which may be represented as vector graphics elements. As most modern displays are raster (i.e., bitmap) devices, vector graphics must be converted into bitmaps before they are rendered. This conversion process is often computationally intensive, particularly for complex or high-resolution artwork. Thus, a user wishing to view such artwork may perceive a delay while the image is rendered. One technique for reducing rendering delays includes only rendering those portions of the artwork located inside the viewable or so-called clip region of the display, and suspending the rendering of other portions of the artwork that are outside of the clip region. However, if the user changes the position or scale level of the clip region by scrolling, panning and/or zooming the view, additional delays occur as new portions of the artwork entering the clip region are rendered.

DETAILED DESCRIPTION

Figure 1A:
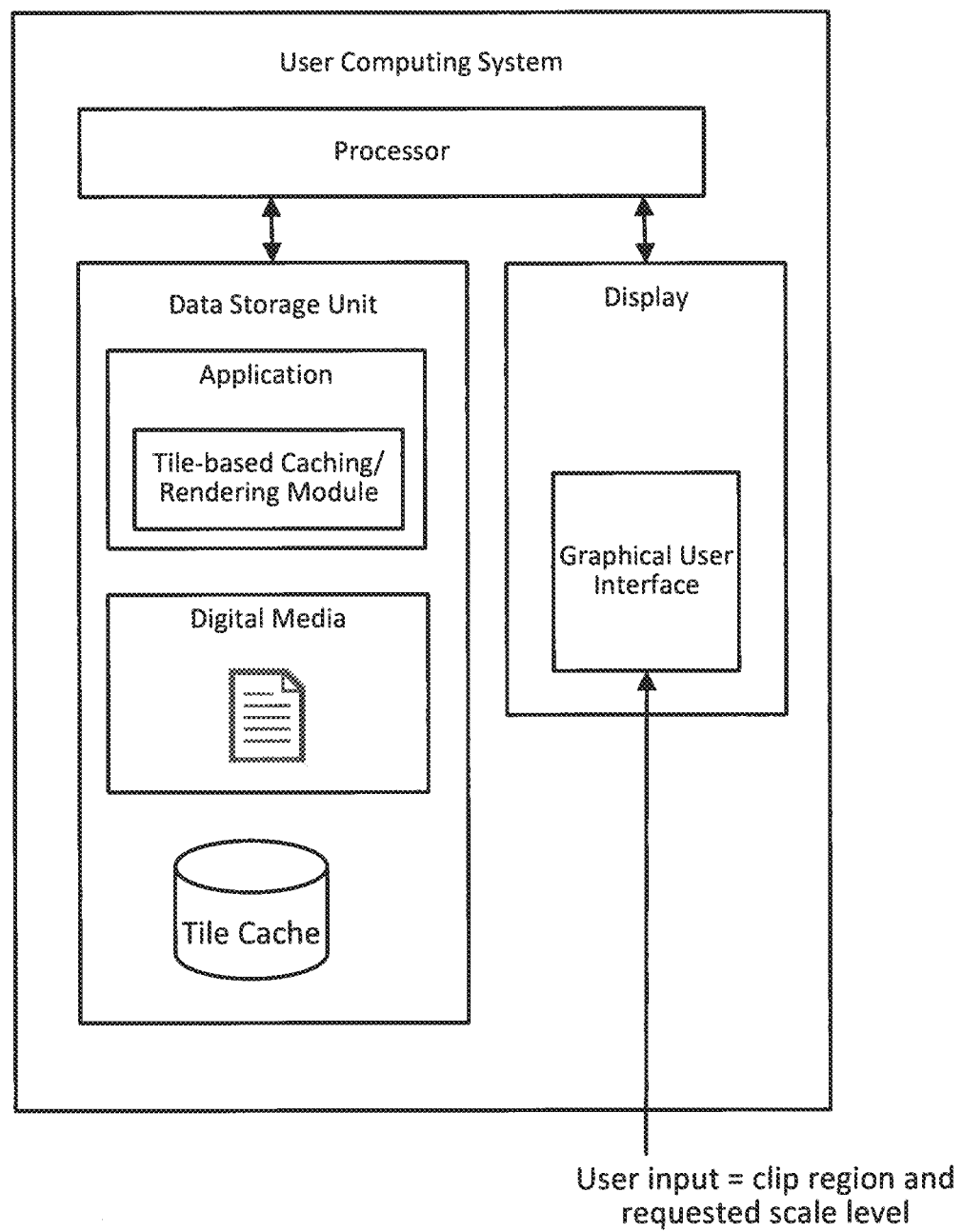
FIG. 1a illustrates an example of a digital media processing system configured in accordance with an embodiment of the present invention.

Various embodiments of the present invention are directed to techniques for rendering complex artwork using tile-based caching in an interactive environment in which scrolling and zooming of a clip region to arbitrary positions and zoom, or scale, levels occurs. The artwork is divided into one or more sets of tiles. Some or all of the tiles are separately rendered at a particular scale level by one or more background threads or processes. As the tiles are rendered, at least some of the tiles are stored in a block of memory readily accessible by a processor, which is also referred to as a cache. The cache may be, for example, memory that is on-board with, or sufficiently proximal to, the processor so as to allow for efficient access to tiles stored in the cache. When user changes the position or scale level of the clip region, previously rendered tiles that provide a so-called best rendering of the artwork in the clip region at the requested scale level are selected from the cache. The initially selected tiles can be displayed in the clip region while the artwork is rendered at the requested scale level. In an embodiment, the best rendering includes the tile or tiles that are more completely rendered than other tiles in the cache, or if multiple tiles are as completely rendered as others, the best rendering includes the tile or tiles that are rendered at a scale level closest to the requested scale level. Once the rendering of the artwork in the clip region is at least as complete as the level of rendering of the tiles selected from the cache, the rendered artwork can be displayed in place of the selected tiles. Numerous configurations and variations will be apparent in light of this disclosure.

General Overview

As previously mentioned, artwork is often represented by vector graphics that must be converted into bitmaps before they are displayed to a user. Since rendering complex vector graphics into bitmaps is computationally intensive, sometimes, to minimize drawing delays, only the portion of the artwork within the clip region is rendered. However, in situations where a user is changing the position or scale level of the clip region by scrolling, panning or zooming in unanticipated ways and more quickly than new portions of the artwork can be rendered, the user may experience significant and undesirable delays before seeing updated renderings. For instance, the display may appear blank in regions where the artwork has not been rendered. Although some techniques exist for incrementally updating the view as newly exposed portions of the clip region are rendered, these techniques, among other things, do not provide the ability to immediately display previously rendered portions of the artwork during the rendering process using a tile-based caching scheme.

Thus, and in accordance with at least one embodiment of the present invention, artwork in a digital image is divided into several subdivisions (also referred to as tiles) for a particular scale level. Prior renderings of individual tiles, whether partial or complete, can be stored in a cache. When a user changes the position of the clip region to include new portions of the image by scrolling, panning or zooming, one or more tiles in the cache corresponding to the best available rendering of the newly exposed portions of the image, if any, are displayed until the new portions of the image are rendered at least as completely as any of the overlapping tiles. The best rendering may include, for example, the tile or tiles that are more completely rendered than other overlapping tiles in the cache. Alternatively, if multiple tiles are as completely rendered as others, the best rendering includes the tile or tiles that are rendered at a scale level closest to the requested scale level. Overlapping tiles are drawn such that lower scale tiles are obscured by higher scale tiles. In this manner, the user can see at least partial renderings of the new portions of the image, drawn from the cached tiles, during the period of time that rendering of the new portions of the image at the requested scale level is performed, thus providing intermediate feedback at an acceptable rate (e.g., approximately 30 frames per second) in response to changes to the position and/or scale level of the clip region.

System Architecture

FIG. 1a illustrates an example digital image processing system configured in accordance with an embodiment of the present invention. In this example, a user computing system includes a processor, a data storage unit accessible by the processor, a graphical user interface and a display. The processor is configured to execute an application (e.g., Adobe Reader® X) for rendering digital media, such as a digital image in a Portable Document Format (PDF) file or any other vector-based rendering application. The processor is also configured to perform the tile-based caching and rendering techniques as variously described herein and implemented in a tile-based caching/rendering module of the application. The application, digital media and/or tile cache are stored in the data storage unit. The tile cache may also be on-board the processor, at least in part. The display is configured to display the digital image, as rendered by the processor. The user interface is configured to enable the user to pan, scroll and/or zoom the portion of the digital image presented in the display. The data storage can be implemented, for example, with any suitable type of memory, such as a disk drive included in, or otherwise in communication with, the processor. Other suitable memories include flash memory, random access memory (RAM), a memory stick or thumb drive, USB drive, cloud storage service, etc. In a more general sense, any memory facility or combination of memory facilities can be used to implement the data storage. Ideally, the tile cache is associated with access times that are suitable to provide a quick response to user requests or otherwise enhance the user experience.

It will be appreciated that, in some embodiments, various functions performed by the processor and the data storage unit, as described herein, can performed by similar processors and/or data storage units in different configurations and arrangements, and that the depicted embodiments are not intended to be limiting. Various components of this example embodiment can be integrated into, for example, one or more desktop or laptop computers, workstations, tablets, smartphones, game consoles, set-top boxes, or other such computing devices. Other componentry and modules typical of a computing system, such as processors (e.g., central processing unit and co-processor, graphics processor, etc.), input devices (e.g., keyboard, mouse, touch pad, touch screen, etc.), and operating system, are not shown but will be readily apparent.

Figure 1B:
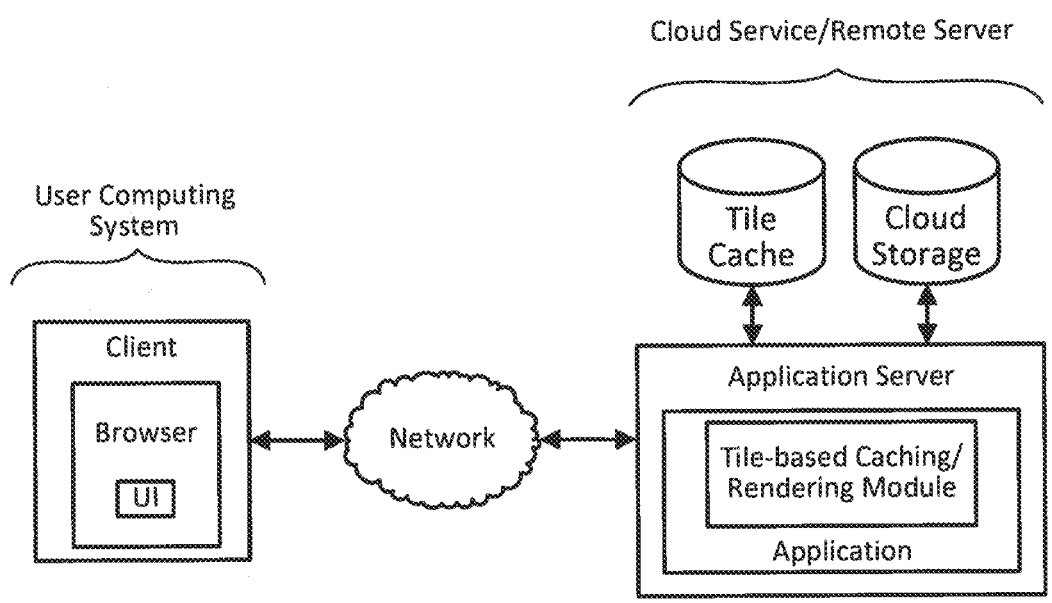
FIG. 1b illustrates an example of a digital media processing system configured in accordance with another embodiment of the present invention.

FIG. 1b illustrates an example of a digital media processing system configured in accordance with another embodiment of the present invention. This system is similar to the system shown in FIG. 1a, except that the user interface module is implemented as part of a browser executing or otherwise implemented on a client that is remote to an application server upon which the tile-based caching/rendering module is executing. Such a client-server embodiment may be suitable, for example, for use in the context of an online digital media processing service that allows a user/client to retrieve data stored in a cloud-based tile cache. Note that the user interface module may be installed local to the client, or an applet or other downloadable module that can be provisioned in real-time to a client requesting access to the cloud service (e.g., any Internet-based storage service). In one such embodiment, the user interface module is provisioned in real-time to the client as a JavaScript applet in response to a user request for access to the cloud service, but any other suitable code and provisioning schemes can be used, as will be appreciated.

In operation, a user can access files, data and applications stored locally to the user in the file system, and may also access files, data and applications stored remotely to the user such as tiles cached or otherwise accessed via the Internet or other communication network (e.g., local and/or wide area network of a company, etc.). The file system of the user computing system can be implemented with any number of suitable file storage schemes. Likewise, the user's client can be implemented with any suitable computing device (e.g., laptop, desktop, tablet, smartphone, etc.). The user interface module (UI) executing on the client may be configured to allow for tile cache access as typically done, and may be further configured with user interface capability to allow for the issuance of user access requests as described herein. The requests can be communicated to the application server via the network (e.g., which may include, for instance, a LAN operatively coupled to the Internet).

Overview of Tile-Caching Methodology

The following is an overview of one example of a tile-caching technique that may be used in conjunction with various embodiments, such as described with respect to the example digital image processing system of FIG. 1a.

Figure 2A:
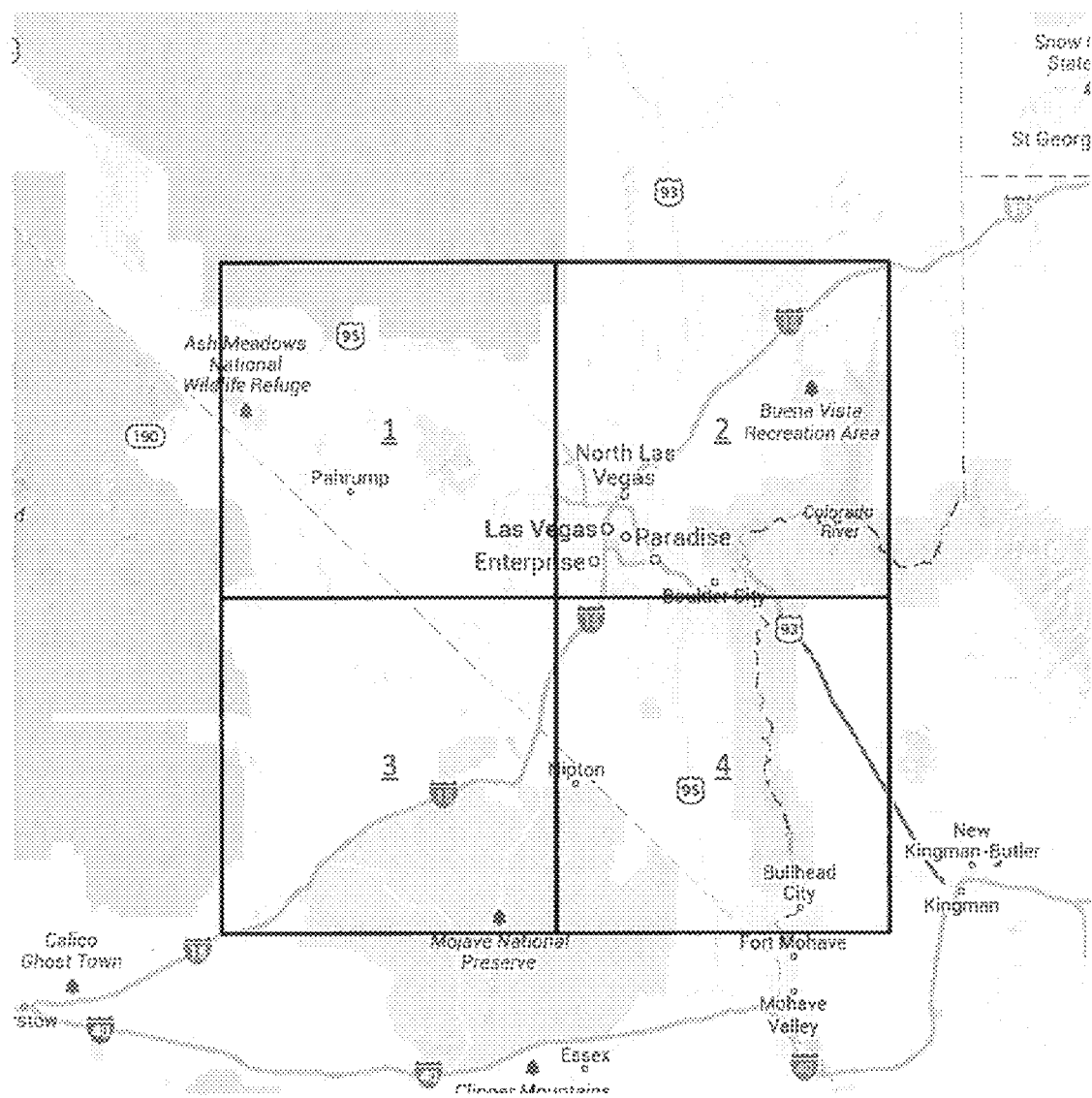
FIGS. 2a, 2b and 2c illustrate several examples of an image tiling scheme in accordance with an embodiment of the present invention.

FIG. 2a depicts an example image tiling scheme in accordance with an embodiment, where the digital image is rendered at a given scale level. The given scale level for a digital image describes a specific subdivision, or tiling, of the image. The tiles in this example are square, with each side of each tile measuring $200/2^{floor(log_2 scale)}$ pixels, where 200 is an arbitrary constant that controls the size of the rendered tiles, and scale is the scale, or zoom, level of the portion of the image in the corresponding tile. As a result of the floor( ) expression, tiles rendered at any two scale levels in the half-open interval $[2^n, 2^{n+1})$ (e.g., 25% and 30%) will span the same portion (also referred to as a grid location) of the image, where n, referred to herein as a tier, is an integral. Thus, each tile within the same tier (e.g., n={ . . . , 3, 2, 1, 0, −1, −2, −3, . . . }) and grid location in the tier will equally span the same areal portion of any rendering of the digital image at scale levels within the half-open interval (e.g., from 12.5 to 24%, 25 to 49%, 50 to 99%, 100 to 199%, etc.). Therefore, it is possible to draw an approximation, for example, of the image rendered at a 110% scale level using a coincident tile rendered at 100%, or an approximation of a rendering at 75% using a coincident tile at 80%. Referring again to the example of FIG. 2a, where the tier n=−1, the image is divided into four tiles, indicated at 1, 2, 3 and 4, which each span the same portion of the image for any scale level between, for example, 25% and 49%. These tiles are stored in a cache, such as described above with respect to FIG. 1a.

Figure 2B:
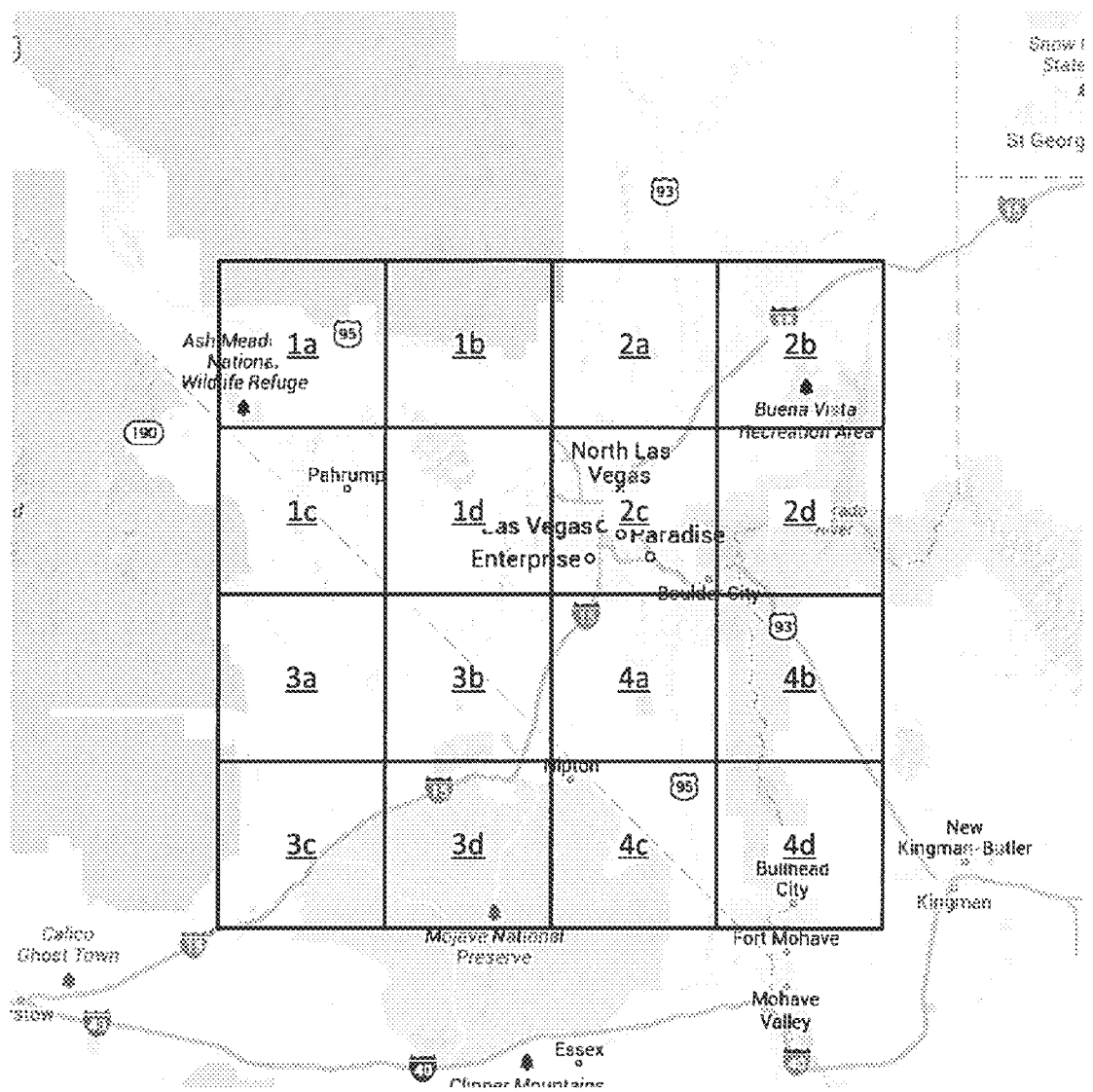

FIG. 2b depicts the same example digital image of FIG. 2a, except that the image is divided into at least 16 equally sized, non-overlapping tiles, indicated at 1a-d, 2a-d, 3a-d and 4a-d corresponding to a different tier (e.g., n=0) than shown in FIG. 2a. For illustrative purposes, FIGS. 2a, 2b, 2c and 3 are not drawn to scale with respect to one another, but it will be understood that the images can be rendered at different scale levels (e.g., 25%, 50%, 100%, etc.), each falling within a corresponding tier, such as described above. Tiles in consecutive tiers have coincident edges; that is, a tile in tier n can be rendered using four tiles from tier n+1. Note that tiles 1a, 1b, 1c and 1d, in combination, are coextensive with tile 1 in FIG. 2a, and tiles 2, 3 and 4 are similarly subdivided. Thus, the portion of the image rendered at any scale level within tier n=0 (FIG. 2b) and contained in, for example, tile 1a, is also fully contained in (overlaps) tile 1 of the image rendered at any scale level within tier n=−1 (FIG. 2a).

Figure 2C:
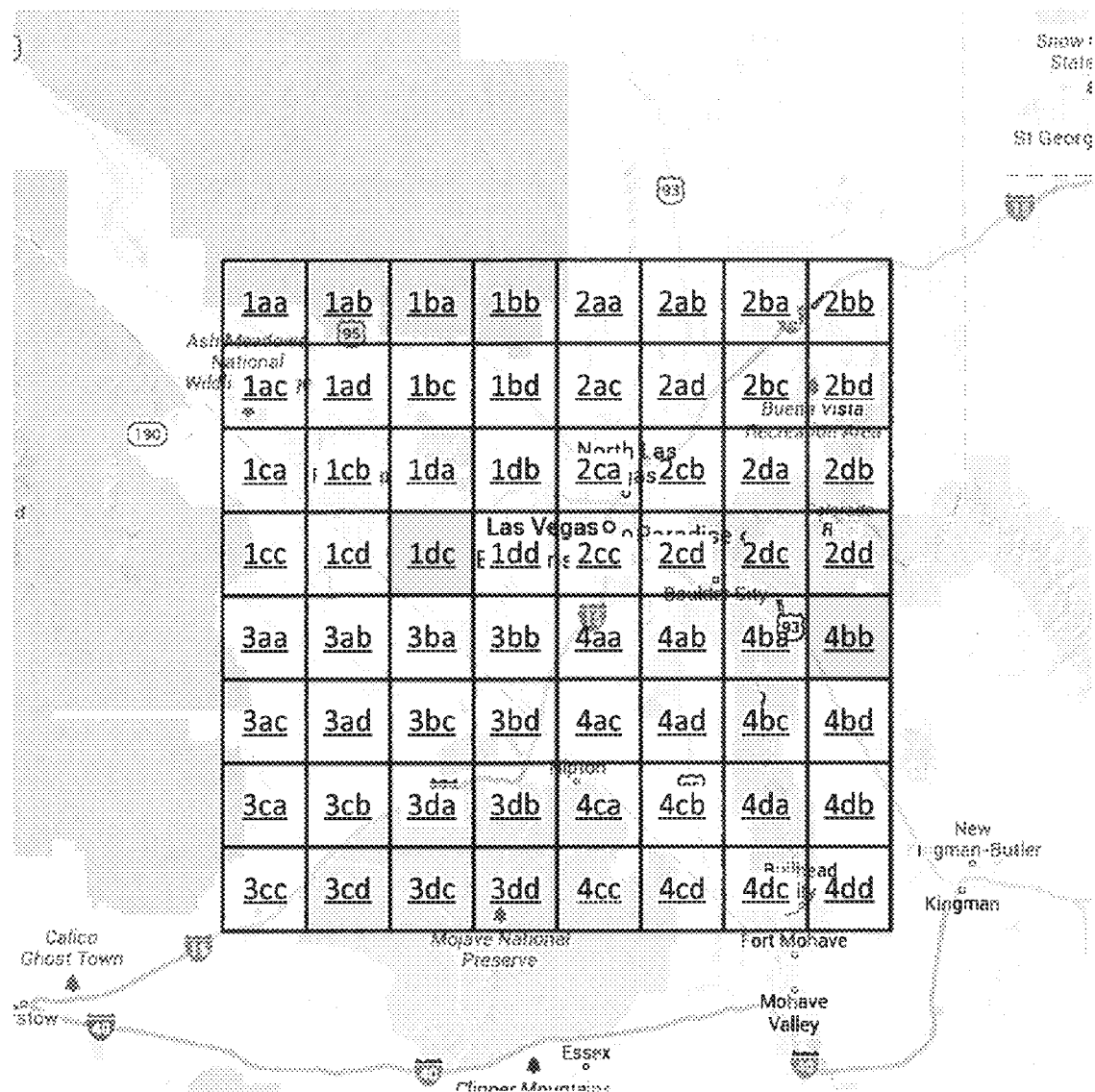

FIG. 2c depicts the same example digital image of FIGS. 2a and 2b, except that the image is now divided into 64 equally sized, non-overlapping tiles, indicated at 1aa-dd, 2aa-dd, 3aa-dd and 4aa-dd corresponding to yet another tier (e.g., n=1). Note that tiles 1aa, 1ab, 1ac and 1ad, in combination, are coextensive with tile 1a in FIG. 2b, and the remaining tiles of FIG. 2c are similarly subdivided. Thus, the portion of the image rendered at any scale level within tier n=1 (FIG. 2c) and contained in, for example, tile 1ab, is also fully contained in tile 1a (FIG. 2b) of the image rendered at any scale level within tier n=0, as well as tile 1 (FIG. 2a) of the image rendered at any scale level within tier n=−1.

In an embodiment, at least some of the tiles, whether partially or fully rendered, can be stored in a cache. Each tile stored in the cache can be referenced by the scale level corresponding to the rendering of the image in the tile. For example, tile 1*ab*, discussed above with respect to FIG. 2*c*, may correspond to any scale level within tier n=1; tile 1*a*, discussed above with respect to FIG. 2*b*, may correspond to any scale level within tier n=0; and so forth. Additionally, each tile can be referenced by how completely rendered the tile is, for instance, percentage-wise how much of the image has been rendered. For example, as stored in the cache, tile 1*ab* may be 100% rendered, tile 1*a* may be 95% rendered, and tile 1 may be 65% rendered. The completeness of the rendering of any tile in the cache is dependent upon prior processing activity and is not necessarily predictable. One reason for this is if the user is panning, scrolling, zooming or otherwise manipulating the image display more quickly than the image can be rendered, portions of the image may never be completely rendered before the user next manipulates the image. Thus, in accordance with an embodiment, tiles that are completely or partially rendered can be cached for potential future use with the methodologies disclosed herein.

Figure 3:
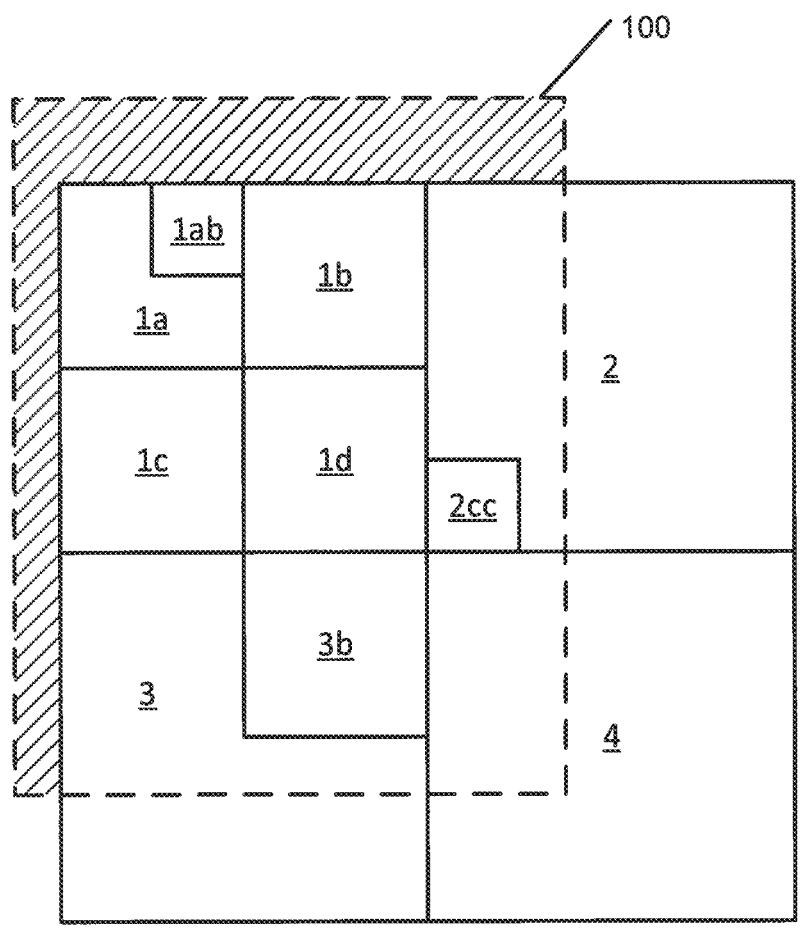
FIG. 3 illustrates an example of a clip region in accordance with an embodiment of the present invention.

FIG. 3 depicts an example of a display or clip region 100, according to an embodiment, and is described in conjunction with the example tiles of FIGS. 2*a*, 2*b* and 2*c*. As discussed above, the clip region 100 includes at least a portion of a digital image that a user has requested to be displayed via, for example, the display unit of FIG. 1*a*. The user request can include, in addition to the position and size of the clip region, a requested scale level; that is, the scale level at which the portion of the image in the clip region 100 should be rendered. For clarity, the digital image in FIG. 3 is depicted as the area within the broken lines of the clip region, indicated at 100. The clip region 100 may, for instance, be requested by the user via the user interface of FIG. 1*a* by scrolling, panning or zooming within the display. In this example, in response to such a user request, one portion of the clip region 100 is coextensive with some of the example cached tiles described above with respect to FIGS. 2*a*, 2*b* and 2*c* (i.e., tiles 1*ab*, 1*b*, 1*bc*, 1*c*, 1*d*, 2*cc*, 3*b*, and parts of tile 1*a*, 2, 3 and 4; also coextensive with the clip region 100, but not shown, are tiles 1, 1*aa*, 1*ac*, 1*ad*, etc., as will be evident from the examples of FIGS. 2*a-c*). As can be further seen, another portion of the clip region 100, indicated by hash lines, is outside of the tiled portions.

Figure 4:
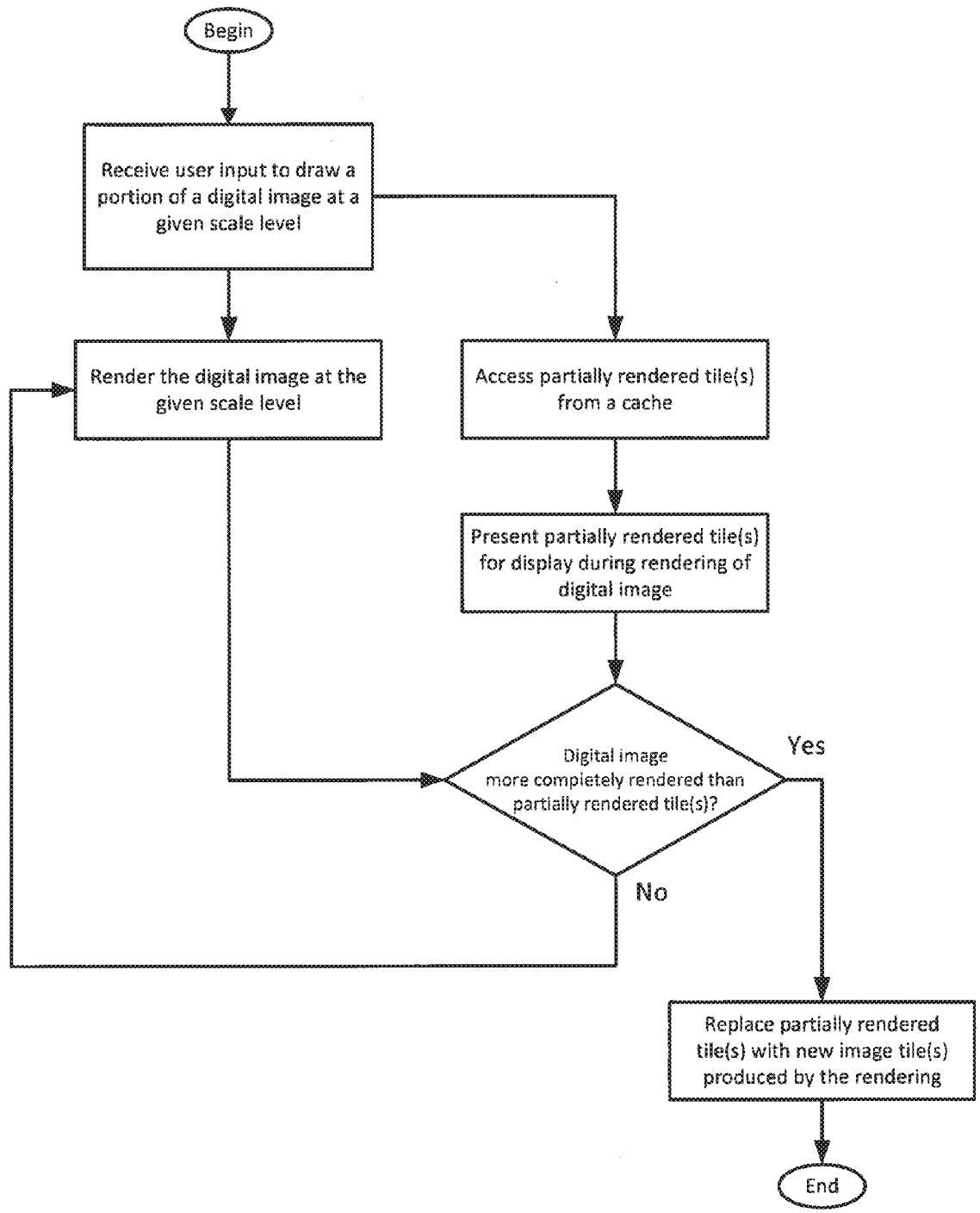
FIG. 4 illustrates an example of a digital media processing methodology configured in accordance with an embodiment of the present invention.

FIG. 4 illustrates an example digital media processing methodology configured in accordance with another embodiment. The method will be described in reference to the example of FIGS. 2*a*, 2*b*, 2*c* and 3. The method begins in response to receiving a user input to draw at least a portion of a digital image at a given scale level. Such an input may be received via, for example, the user interface of FIG. 1*a*. For example, the user may generate the input by manipulating (moving, selecting a region, resizing, zooming, etc.) an image shown on the display to define the clip region 100 of FIG. 3. The user input may be passed to the method as a set of parameters such as page number, scale (zoom) level and the coordinates of the clip region 100. As can be seen in FIG. 3, portions of the clip region 100 overlap with some of the tiles in the cache, including, as mentioned above, tiles corresponding to 1*ab*, 1*b*, 1*bc*, 1*c*, 1*d*, 2*cc*, 3*b*, and parts of tiles corresponding to 1*a*, 2, 3 and 4. Other tiles, such as shown in FIGS. 2*a*, 2*b* and 2*c*, may be present in the cache but for clarity are not illustrated in FIG. 3. Some of these tiles may be completely or partly rendered at their respective scale levels.

Once the user input is received, a portion of the digital image (e.g., at least the portion in the new clip region 100) is rendered at the given scale level. One or more partially rendered image tiles are accessed from a cache and presented for display during rendering of the digital image. The partially rendered image tiles correspond to at least a portion of the clip region 100. One example methodology for accessing and presenting partially rendered image tiles from the cache is described below with respect to FIG. 5. As the rendering of the digital image progresses, one or more of the partially rendered image tiles from the cache are replaced with one or more new image tiles produced by the rendering once the new image tiles are more completely rendered than the partially-rendered image tiles. The rendering continues until the digital image is completely rendered or some other event occurs (e.g., the user changes the clip region 100 and/or scale level again).

Figure 5:
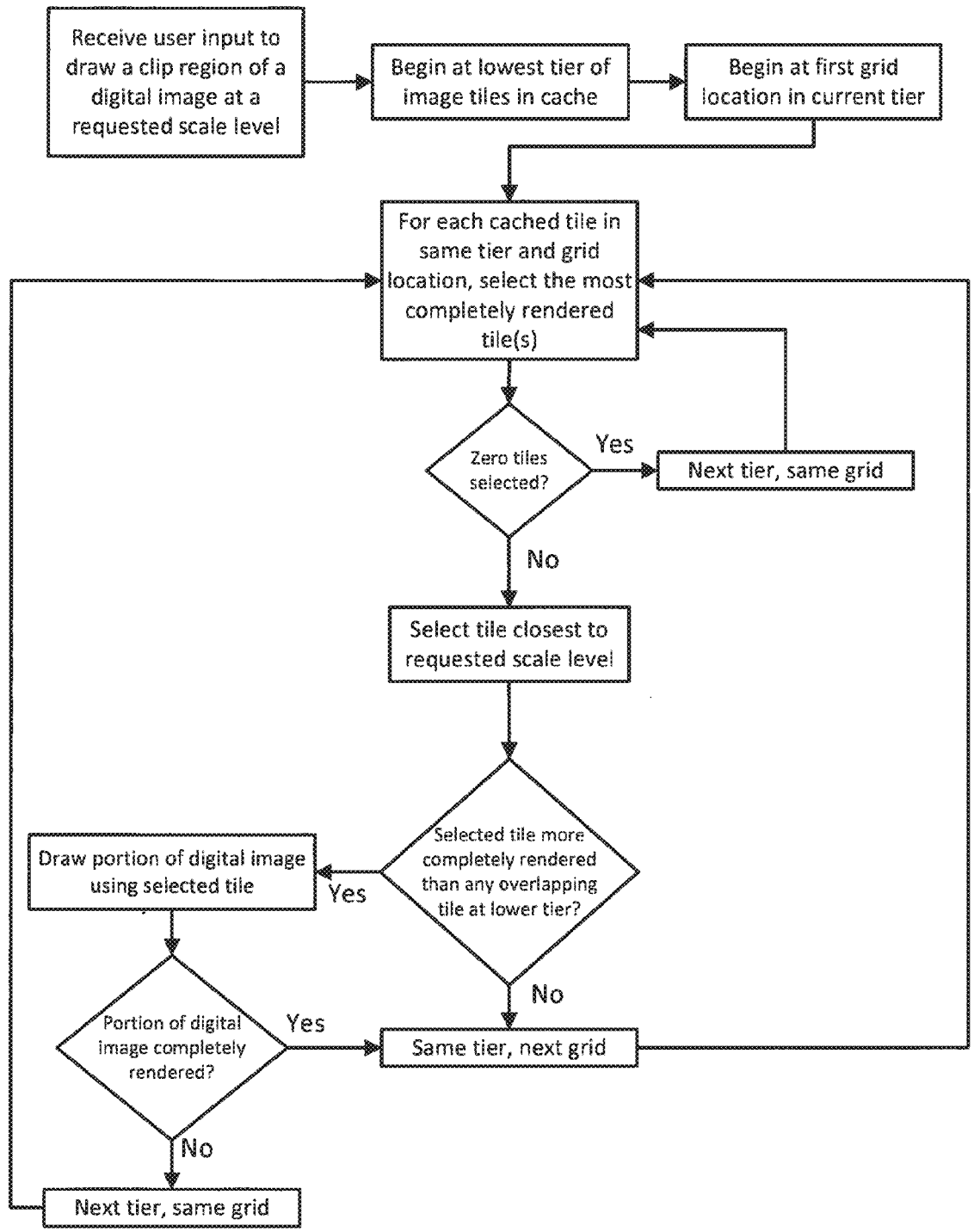
FIG. 5 illustrates an example of a digital medial processing methodology configured in accordance with another embodiment of the present invention.

FIG. 5 illustrates a more detailed example digital media processing methodology configured in accordance with an embodiment. The method will be described in reference to the example of FIGS. 2*a*, 2*b*, 2*c* and 3. The method begins in response to receiving a user input to draw a clip region of a digital image at a requested scale level. Such an input may be received via, for example, the user interface of FIG. 1*a*. For example, the user may generate the input by manipulating (moving, selecting a region, resizing, zooming, etc.) an image shown on the display to define the clip region 100 of FIG. 3. The user input may be passed to the method as a set of parameters such as page number, scale (zoom) level and the coordinates of the clip region 100. As can be seen in FIG. 3, portions of the clip region 100 overlap with some of the tiles in the cache rendered at various scale levels in one or more tiers, including, as mentioned above, tiles 1*ab*, 1*b*, 1*bc*, 1*c*, 1*d*, 2*cc*, 3*b*, and parts of tile 1*a*, 2, 3 and 4. Other tiles, such as shown in FIGS. 2*a*, 2*b* and 2*c*, may be present in the cache but for clarity are not illustrated in FIG. 3. Some of these tiles may be completely or partly rendered at their respective scale levels.

Once the user input is received, beginning at the first grid location of the lowest tier, two or more overlapping cached tiles each rendered at different scale levels within the same tier (if any) are compared. The cached tiles in the comparison represent at least one coextensive portion of the clip region 100. For example, tile 1*a* is within and includes a portion of the clip region 100, although tile 1*a* may be rendered (or at least partially rendered) at two or more different scale levels within the same tier (e.g., n=0 for tile 1*a*, which is cached at scale levels of 110% and 100%). If there are no cached tiles in a given tier for a given grid location, then no tiles are selected for this tier and grid location. Tiles from higher tiers may be painted in this region, if they are more complete than lower-tier tiles overlapping this region.

The comparison of the tiles is used to first determine if one cached tile is more completely rendered (e.g., percentage-wise) than any other overlapping cached tile in the same tier. If, for instance, a first cached tile is rendered more completely (e.g., 100% rendered) than a second, overlapping cached tile (e.g., 95% rendered), then image data representing the first cached tile is selected and provided for drawing at least a portion of the digital image in the clip region 100. If, however, a second cached tile is more completely rendered than a first cached tile, the second cached tile is selected and provided for drawing the portion of the clip region 100.

If two or more tiles being compared are rendered as completely (e.g., percentage-wise) as each other (e.g., the first and second tiles are equally rendered), then image data representing the tile that is rendered closer to the requested scale level of the clip region 100 (e.g., 65%) is selected for drawing the respective portion of the digital image. For instance, if a first cached tile is 50% rendered at a 60% scale level and a second, overlapping cached tile is also 50% rendered but at a 55% scale level, then image data representing the first cached tile is selected for drawing the respective portion of the digital image in the clip region 100 because the first cached tile has a scale level (60%) closer to the requested scale level of the clip region 100 (65%) than the second cached tile (scale level 55%). Otherwise, image data representing the second cached tile is selected for drawing the respective portion of the clip region. If any of the cached tiles being compared are completely (100%) rendered, then such tiles are selected for drawing the respective portion of the clip region. The selected tile is used to draw the respective portion of the clip region if it is at least as completely rendered as the cached tiles from same grid location of a lower tier(s). If the selected tile is not at least as completely rendered as the cached tiles from the same grid location of a lower tier(s), the selected tile is not used for drawing.

If the grid location is completely rendered using one or more of the cached tiles, then the process repeats for the next grid location until all grid locations have been traversed. Otherwise, the process repeats for the same grid location using cached tiles (if any) at the next higher tier until the grid location is completely rendered. In some embodiments, the process is repeated only for a certain number of tier traversals, for example, one or two higher tiers, after which the process reverts to the original tier level and repeats for the next grid location.

The methods of FIGS. 4 and 5 may be implemented, for example, by the processor, as shown in FIG. 1*a* or 1*b*, or their equivalents. It will be appreciated that the order of functionality in the methodologies disclosed herein may vary from one embodiment to another and in sequences not specifically described, but when considered in the aggregate, form or otherwise provide a complete digital media processing methodology.

As will be further appreciated in light of this disclosure, the various modules and components, such as the application, can be implemented in software, such as a set of instructions (e.g. C, C++, object-oriented C, JavaScript, BASIC, etc.) encoded on any computer readable medium (e.g., hard drive, server, or other suitable memory), that when executed by one or more processors, cause the various methodologies provided herein to be carried out. In other embodiments, the components/modules may be implemented with hardware, such as gate level logic (e.g., FPGA) or a purpose-built semiconductor (e.g., ASIC). Still other embodiments may be implemented with a microcontroller having a number of input/output ports for receiving and outputting data, and a number embedded routines for carrying out the functionality described herein. Any suitable combination of hardware, software, and firmware can be used.

Numerous embodiments will be apparent in light of the present disclosure, and features described herein can be combined in any number of configurations. One example embodiment provides a computer-implemented digital media processing. The method includes comparing a first cached image tile to a second cached image tile to determine which is more completely rendered than the other, or has a rendered scale level closest to a requested scale level, if the first cached image tile is as completely rendered as the second cached image tile. The method further includes providing image data representing one of the first cached image tile and the second cached image tile for display based on the comparison for drawing at least a portion of a digital image. In some cases, the rendered scale level of the first cached image tile is different than the rendered scale level of the second cached image tile. In some cases, the method includes initiating a rendering process for rendering the digital image at the requested scale level in response to a rendering request. In some cases, the method includes providing, during the rendering process, additional image data representing rendered portions of the digital image for drawing the rendered portions of the digital image at the requested scale level in response to a determination that the digital image is more completely rendered than each of the first cached image tile and the second cached image tile. In some cases, the image data represents the first cached image tile if the first cached image tile is more completely rendered than the second cached image tile, or if the requested scale level is closer to the rendered scale level of the first cached image tile than to the rendered scale level of the second cached image tile and the first cached image tile is as completely rendered as the second cached image tile. Otherwise, the image data represents the second cached image tile if the second cached image tile is more completely rendered than the first cached image tile, or if the requested scale level is closer to the rendered scale level of the second cached image tile than to the rendered scale level of the first cached image tile and the second cached image tile is as completely rendered as the first cached image tile. In some cases, the portion of the digital image is a first portion, and the method includes providing additional image data representing one of the first cached image tile and the second cached image tile based on the comparison for drawing a second portion of the digital image that is at least partially overlapped by the first portion of the digital image. In some cases, the additional image data represents the first cached image tile if the first cached image tile is less completely rendered than the second cached image tile, or if the requested scale level is further from the rendered scale level of the first cached image tile than from the rendered scale level of the second cached image tile and the first cached image tile is as completely rendered as the second cached image tile. Otherwise, the additional image data represents the second cached image tile if the second cached image tile is less completely rendered than the first cached image tile, or if the requested scale level is further from the rendered scale level of the second cached image tile than from the rendered scale level of the first cached image tile and the second cached image tile is as completely rendered as the first cached image tile. In some cases, the digital image is included in a Portable Document Format (PDF) file. Another embodiment provides a digital media processing system having a storage and a processor operatively coupled to the storage. The processor is configured to perform one or more of the functions variously defined in the present disclosure, such as the digital media processing functions variously described in the preceding paragraph. Another embodiment provides a non-transient computer-readable medium or computer program product having instructions encoded thereon that when executed by one or more processors cause the processor to perform one or more of the functions variously defined in the present disclosure, such as the digital media processing functions variously described in the preceding paragraph.

Another embodiment provides a computer-implemented media processing method. The method includes receiving a request to render a digital image at a given scale level and rendering the digital image at the given scale level. The method further includes accessing, from a cache, one or more image tiles that are partially rendered, presenting the partially-rendered image tiles for display during the rendering, and replacing the partially-rendered image tiles with one or more new image tiles produced by the rendering once the new image tiles are more completely rendered than the partially-rendered image tiles. In some cases, the partially-rendered image tiles have a rendered scale level closest to the given scale level.

The foregoing description and drawings of various embodiments are presented by way of example only. These examples are not intended to be exhaustive or to limit the invention to the precise forms disclosed. Numerous variations will be apparent in light of this disclosure. Alterations, modifications, and variations will readily occur to those skilled in the art and are intended to be within the scope of the invention as set forth in the claims.

What is claimed is:

1. A computer-implemented digital media processing method comprising:
   comparing a first cached image tile to a second cached image tile to determine which:
      is more completely rendered than the other, if one of the first cached image tile and the second cached image tile is more completely rendered than the other, and
      has a rendered scale level closest to a requested scale level, if the first cached image tile is as completely rendered as the second cached image tile; and
   providing image data representing one of the first cached image tile and the second cached image tile for display based on the comparison for drawing at least a portion of a digital image.

2. The method of claim 1, wherein the rendered scale level of the first cached image tile is different than the rendered scale level of the second cached image tile.

3. The method of claim 1, further comprising initiating a rendering process for rendering the digital image at the requested scale level in response to a rendering request.

4. The method of claim 3, further comprising providing, during the rendering process, additional image data representing rendered portions of the digital image for drawing the rendered portions of the digital image at the requested scale level in response to a determination that the digital image is more completely rendered than each of the first cached image tile and the second cached image tile.

5. The method of claim 1:
   wherein the image data represents the first cached image tile if the first cached image tile is more completely rendered than the second cached image tile, or if the requested scale level is closer to the rendered scale level of the first cached image tile than to the rendered scale level of the second cached image tile and the first cached image tile is as completely rendered as the second cached image tile; and
   wherein the image data represents the second cached image tile if the second cached image tile is more completely rendered than the first cached image tile, or if the requested scale level is closer to the rendered scale level of the second cached image tile than to the rendered scale level of the first cached image tile and the second cached image tile is as completely rendered as the first cached image tile.

6. The method of claim 1, wherein the portion of the digital image is a first portion, and wherein the method further includes providing additional image data representing one of the first cached image tile and the second cached image tile based on the comparison for drawing a second portion of the digital image that is at least partially overlapped by the first portion of the digital image.

7. The method of claim 6:
   wherein the additional image data represents the first cached image tile if the first cached image tile is less completely rendered than the second cached image tile, or if the requested scale level is further from the rendered scale level of the first cached image tile than from the rendered scale level of the second cached image tile and the first cached image tile is as completely rendered as the second cached image tile; and
   wherein the additional image data represents the second cached image tile if the second cached image tile is less completely rendered than the first cached image tile, or if the requested scale level is further from the rendered scale level of the second cached image tile than from the rendered scale level of the first cached image tile and the second cached image tile is as completely rendered as the first cached image tile.

8. The method of claim 1, wherein the digital image is included in a Portable Document Format (PDF) file.

9. A digital media processing system, comprising:
   a storage; and
   a processor operatively coupled to the storage and configured to:
   compare a first cached image tile to a second cached image tile to determine which:
      is more completely rendered than the other, if one of the first cached image tile and the second cached image tile is more completely rendered than the other, and
      has a rendered scale level closest to a requested scale level, if the first cached image tile is as completely rendered as the second cached image tile; and
   provide image data representing one of the first cached image tile and the second cached image tile for display based on the comparison for drawing at least a portion of a digital image.

10. The system of claim 9, wherein the rendered scale level of the first cached image tile is different than the rendered scale level of the second cached image tile.

11. The system of claim 9, wherein the processor is further configured to initiate a rendering process for rendering the digital image at the requested scale level in response to a rendering request.

12. The system of claim 11, wherein the processor is further configured to provide, during the rendering process, additional image data representing rendered portions of the digital image for drawing the rendered portions of the digital image at the requested scale level in response to a determination that the digital image is more completely rendered than each of the first cached image tile and the second cached image tile.

13. The system of claim 9:
   wherein the image data represents the first cached image tile if the first cached image tile is more completely rendered than the second cached image tile, or if the requested scale level is closer to the rendered scale level of the first cached image tile than to the rendered scale level of the second cached image tile and the first cached image tile is as completely rendered as the second cached image tile; and
   wherein the image data represents the second cached image tile if the second cached image tile is more completely rendered than the first cached image tile, or if the requested scale level is closer to the rendered scale level of the second cached image tile than to the rendered scale level of the first cached image tile and the second cached image tile is as completely rendered as the first cached image tile.

14. The system of claim 9, wherein the portion of the digital image is a first portion, and wherein the processor is further configured to provide additional image data representing one of the first cached image tile and the second cached image tile based on the comparison for drawing a second portion of the digital image that is at least partially overlapped by the first portion of the digital image.

15. The system of claim 14:
wherein the additional image data represents the first cached image tile if the first cached image tile is less completely rendered than the second cached image tile, or if the requested scale level is further from the rendered scale level of the first cached image tile than from the rendered scale level of the second cached image tile and the first cached image tile is as completely rendered as the second cached image tile; and
wherein the additional image data represents the second cached image tile if the second cached image tile is less completely rendered than the first cached image tile, or if the requested scale level is further from the rendered scale level of the second cached image tile than from the rendered scale level of the first cached image tile and the second cached image tile is as completely rendered as the first cached image tile.

16. The system of claim 9, wherein the digital image is included in a Portable Document Format (PDF) file.

17. A non-transient computer-readable medium having instructions encoded thereon that when executed by a processor cause the processor to:
compare a first cached image tile to a second cached image tile to determine which:
is more completely rendered than the other, if one of the first cached image tile and the second cached image tile is more completely rendered than the other, and
has a rendered scale level closest to a requested scale level, if the first cached image tile is as completely rendered as the second cached image tile; and
provide image data representing one of the first cached image tile and the second cached image tile for display based on the comparison for drawing at least a portion of a digital image.

18. The computer-readable medium of claim 17, further comprising instructions that when executed by the processor cause the processor to initiate a rendering process for rendering the digital image at the requested scale level in response to a rendering request.

19. The computer-readable medium of claim 18, further comprising instructions that when executed by the processor cause the processor to provide, during the rendering process, additional image data representing rendered portions of the digital image for drawing the rendered portions of the digital image at the requested scale level in response to a determination that the digital image is more completely rendered than each of the first cached image tile and the second cached image tile.

20. The computer-readable medium of claim 17, wherein the portion of the digital image is a first portion, and wherein computer-readable medium further comprises instructions that when executed by the processor cause the processor to provide additional image data representing one of the first cached image tile and the second cached image tile based on the comparison for drawing a second portion of the digital image that is at least partially overlapped by the first portion of the digital image.

21. A computer-implemented media processing method comprising:
receiving a request to render a digital image at a given scale level;
rendering the digital image at the given scale level;
accessing, from a cache, one or more image tiles that are partially rendered;
presenting the partially rendered image tiles for display during the rendering; and
replacing the partially rendered image tiles with one or more new image tiles produced by the rendering once the one or more new image tiles are more completely rendered than the partially-rendered image tiles,
wherein the accessed partially-rendered image tiles are those having a closest scale level to the given scale level out of a plurality of partially-rendered image tiles matching the digital image.

* * * * *